Nov. 10, 1953 S. J. BEGUN 2,658,956

MAGNETIC RECORDING AND REPRODUCING

Filed April 21, 1947

5 Sheets-Sheet 1

*INVENTOR.*

SEMI JOSEPH BEGUN

*BY*

ATTORNEY

INVENTOR.
SEMI JOSEPH BEGUN
BY
Eber J. Hyde
ATTORNEY

Nov. 10, 1953

S. J. BEGUN 2,658,956

MAGNETIC RECORDING AND REPRODUCING

Filed April 21, 1947

5 Sheets-Sheet 3

INVENTOR.
SEMI JOSEPH BEGUN
BY
Eber J. Hyde
ATTORNEY

Nov. 10, 1953 S. J. BEGUN 2,658,956

MAGNETIC RECORDING AND REPRODUCING

Filed April 21, 1947 5 Sheets-Sheet 4

INVENTOR
S.J. BEGUN
BY [signature]
ATTORNEY

INVENTOR
S. J. BEGUN
BY [signature]
ATTORNEY

Patented Nov. 10, 1953 2,658,956

UNITED STATES PATENT OFFICE 2,658,956

MAGNETIC RECORDING AND REPRODUCING

Semi Joseph Begun, Cleveland Heights, Ohio, assignor, by mesne assignments, to Clevite Corporation, Cleveland, Ohio, a corporation of Ohio Application April 21, 1947, Serial No. 742,793

1 Claim. (Cl. 179—100.2)

This application is a continuation-in-part of application Serial No. 612,728, filed August 27, 1945, for Magnetic Recording and Reproducing, in the name of Semi Joseph Begun, which issued as Patent No. 2,535,480, on December 26, 1950.

This invention relates to magnetic recording and reproducing systems in which magnetic signals are recorded and reproduced by magnetic flux interlinkage between windings of a magnetic record transducer head and elements of magnetic recording medium engaging the pole faces of the transducer head during relative motion between the transducer head and the recording medium.

Among the objects of this invention is a novel magnetic record transducer system of the foregoing type, which involves recording magnetic signals on closely adjacent magnetic record traces of an extended magnetic record surface, such as a magnetic record surface of a sheet, and carrying on the recording process with a signal modulated carrier in order to suppress crosstalk when playing back the records from adjacent magnetic record traces.

The foregoing and other objects of the invention will be best understood from the following description of exemplifications thereof, reference being had to the accompanying drawings wherein.

Figure 4:
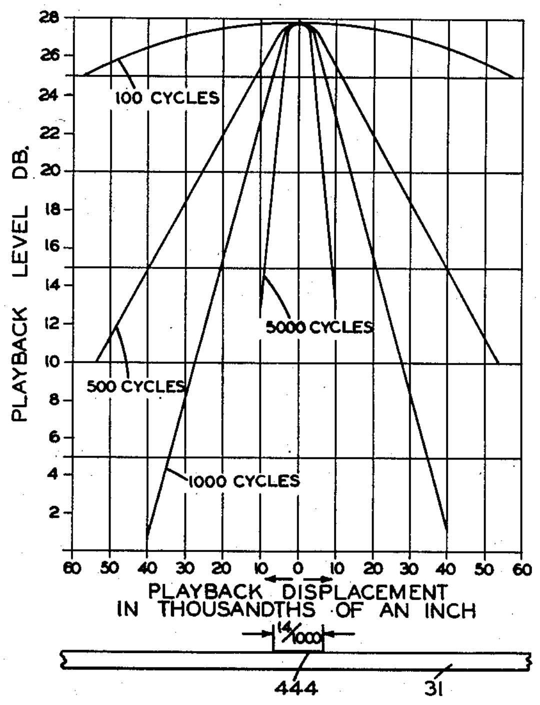
Figure 5:
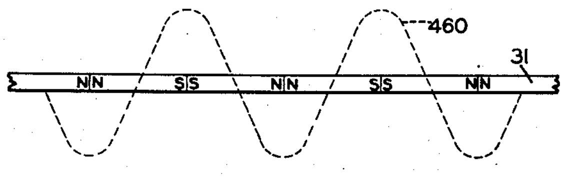
Figure 4A:
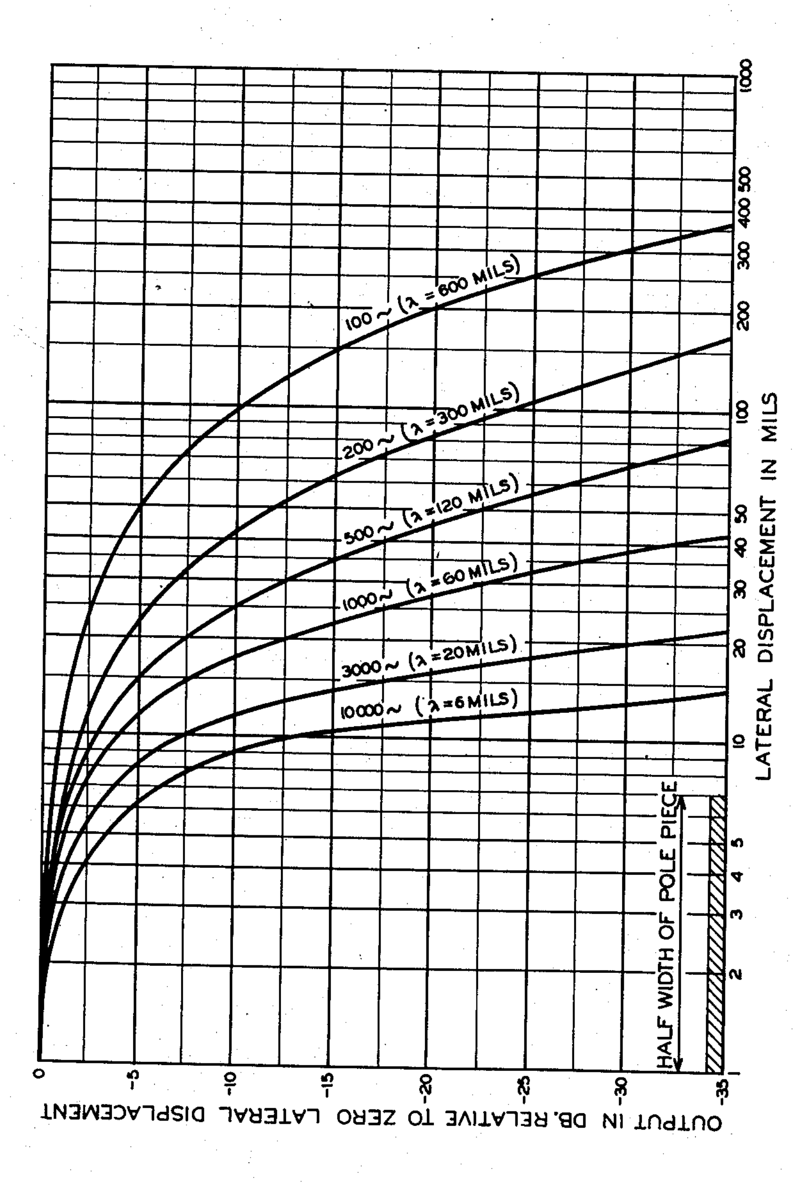
Figure 6:
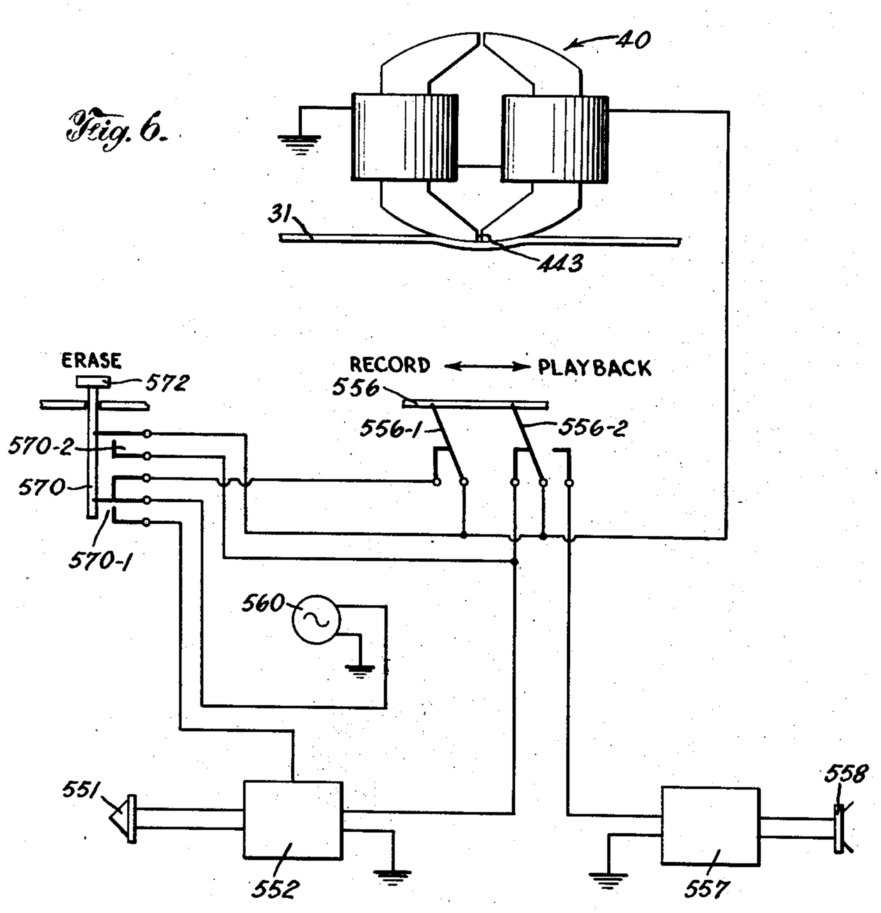
Figure 7:
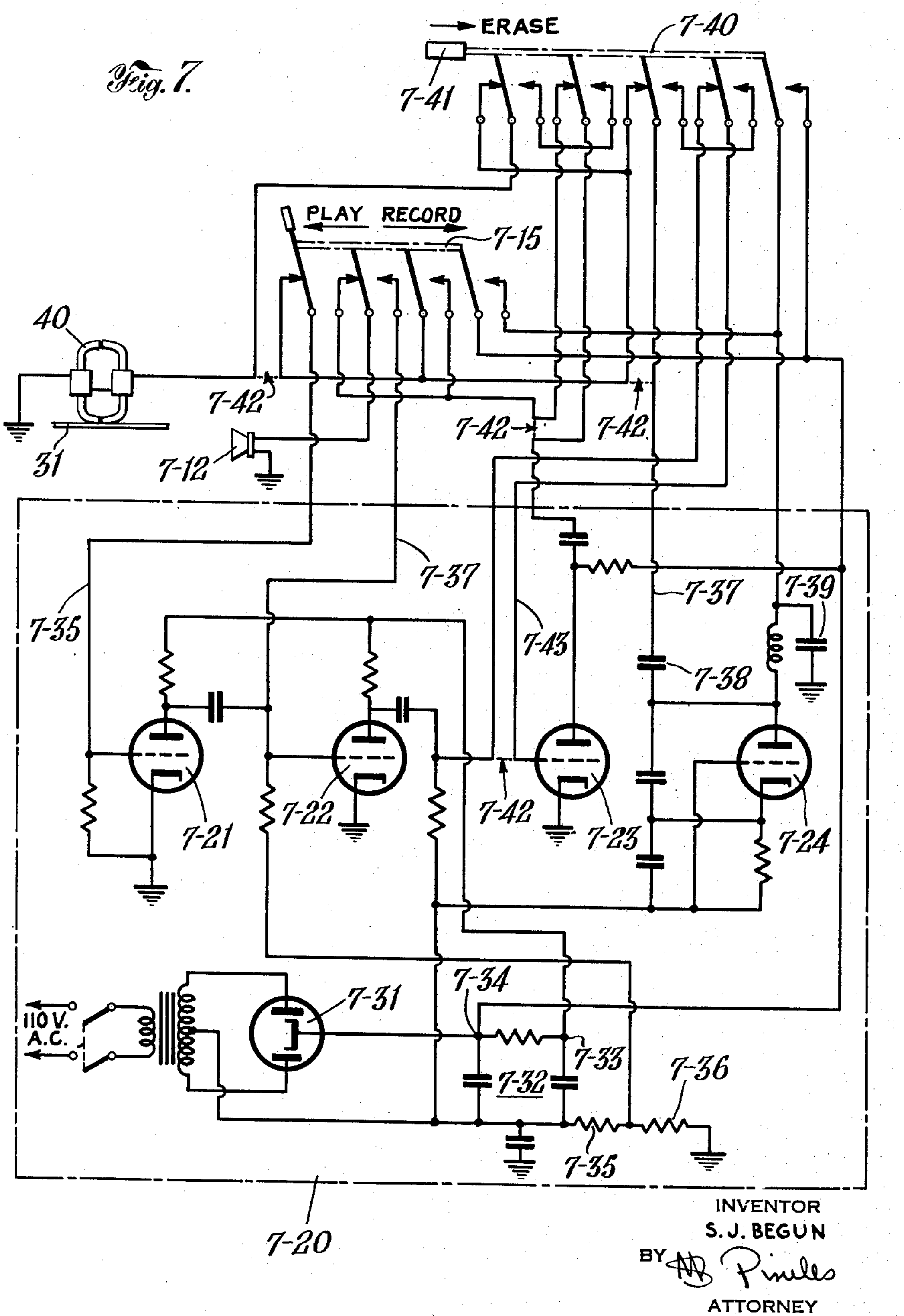

Figs. 4 and 4–A are curve diagrams showing the crosstalk effect due to flux interlinkage between adjacent record traces at different frequencies;

Fig. 5 is a curve diagram illustrating the relationship of the form of the magnetically recorded signal wave and the length of the magnet elements formed by the recorded signals along the record trace;

Fig. 6 is a diagrammatic view of the general arrangement of a simplified form of a magnetic recording and reproducing system based on the principles of the invention;

Fig. 7 is a diagram illustrating the general arrangement of another form of magnetic recording and reproducing system of the invention.

Figure 1:
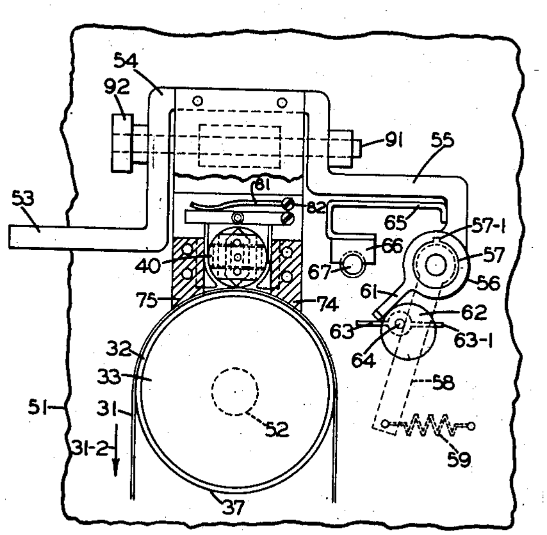
Fig. 1 is a side view showing the general relationship of a magnetic record transducing head as it is used for recording signals on adjacent traces of a flexible record sheet member held on a carrier guide member and for playing back signals while the recording medium is moved passed the pole faces of the transducer head.
Figure 2:
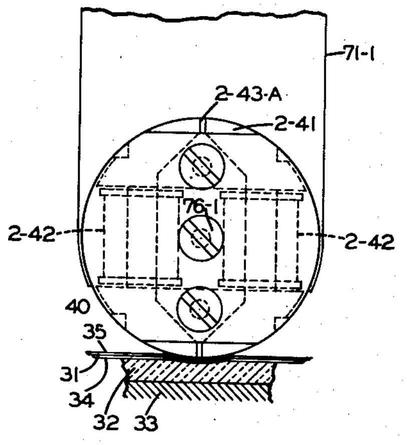
Fig. 2 is an enlarged detail view of the relationship of the magnetic head to the recording medium and the associated guide means.
Figure 3:
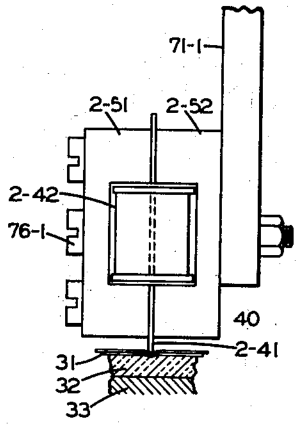
Fig. 3 is a side view of the elements of Fig. 2.

Figs. 1 to 3 show in a generally diagrammatic manner a portion of a moving magnetic record track sheet member 31 resting on a surface layer 32 of a relatively rigid support member 33. The record track sheet member 31 may be formed of a backing or base sheet 34 of relatively strong material, such as craft paper, having united to one or both of its surfaces a stratum 35 of a dispersion compound having dispersed therein finely powdered permanently magnetizable particles of a particle size of the order of about 1 micron or less. One type of such magnetic record member and magnetic record transducing system operating with such recording medium is described in Kornei application Serial No. 685,092 filed July 20, 1946, now abandoned.

Alternatively, the magnetic record surface may be formed of a thin plating of ferro-magnetic alloys, such as cobalt and nickel, on a thin flexible sheet member such as thin copper, brass or zinc, and such record members have been found to be very effective in magnetic recording systems of the invention.

Such plated magnetic record media may be of the type described in the application Serial No. 738,973 filed April 2, 1947, by P. P. Zapponi, now abandoned.

The magnetic record sheet member may have the form of a flexible circular disc generally similar to phonograph discs, having at least on one side an exposed magnetic record track surface on which records may be made by a transducer head such as shown in Figs. 2 and 3 along adjacent convolutions of a spirally extending magnetic record trace, the head being guided by suitable guide means such as described, for instance in my application Serial No. 612,728 filed August 27, 1945, now Patent No. 2,535,480 which issued on December 26, 1950, or in the application Serial No. 651,637 filed March 2, 1946, by A. L. W. Williams, now abandoned. Alternatively, as indicated in Fig. 1, the record sheet member 31 may be made in the form of a flat flexible sheet joined to form an endless loop and arranged to be guided and driven by a roller 33 having a surface of frictional material for maintaining frictional coupling with the facing surface portion of the record sheet member 31 engaged thereby.

The record sheet member is arranged for cooperation with a magnetic record transducing head generally designated 40, shown enlarged in Figs. 2 and 3. The magnetic record transducer head embodies a magnetic core structure shown formed of two thin flat pole pieces 2–41 held aligned in a plane, and transducer windings shown formed of two coils 2-42, each surrounding one of the pole pieces. The thickness of the pole pieces 2-41 is of the order of the thickness of the magnetic record trace along which a record is made on the magnetic record track surface 35 of the record track 31.

The two pole pieces 2-41 are held longitudinally aligned in a plane on the opposite sides of a working gap 2-43 which is shown exaggerated for the sake of clarity, but is only of the order of one thousandth or two thousandths of an inch. The outwardly facing edge surfaces 2-44 of the pole pieces 2-41 which border the gap are convexly curved so as to constitute two elongated pole faces arranged so that when a portion of the record track surface 35 of the record sheet member 31 is placed against the pole faces, a record trace portion of the record track surface may be flexed into tangential engagement with the convex pole faces 2-44 of the pole pieces, and thus assure that positive stable contact conditions will be maintained between the pole pieces and the record trace of the record track sheet 31 at the point of contact engagement therebetween.

The narrow magnetic gap region 2-43 formed by the inwardly facing edge surfaces of the pole pieces 2-41 is substantially parallel for a short inward distance of the order of about thirty thousandths of an inch and the adjoining inward region of the inwardly facing edge surfaces is tapered to provide a widely tapered gap region 2-45 which has relatively great reluctance compared to the magnetic path of the core structure which is interlinked with the transducer windings 2-42. The transducer windings 2-42 are shown in the form of bobbins on which the windings are wound after the bobbin is first placed on the pole piece. The bobbin with its longitudinal central core may be molded of a suitable synthetic resin insulating material and may be provided with a slit for seating it in a centered position on the pole piece, as indicated in the drawings.

The two pole pieces with their bobbins are held in their aligned operative position shown by uniting the two aligned pole pieces to a mounting structure shown formed of two mounting members 2-51, 2-52. One of the mounting members, for instance, the mounting member 2-51 may be made of metal and the two pole pieces may be united thereto in their aligned critical gap position either by soldering, electrical spot welding, or by cementing. In order to make it possible to secure the pole pieces to a metallic mounting member 2-51 by spot welding, each sheet element forming the pole pieces may be provided with laterally protruding extensions 2-47 overlying a flat surface portion of the mounting member 2-51 along which the pole pieces are held flatly aligned so that by applying the electrodes of the spot welding apparatus to such pole piece extension 2-47 and the underlying mounting member 2-51, each pole piece may be readily united by electrical spot welding to its mounting member while they are maintained in their aligned position thereon by a suitable jig.

It will be noted that the pole piece extensions 2-47, which serve as spot welding connections to the metallic mounting member 2-51, are not required to carry any flux and any impairment of their magnetic qualities incident to the spot welding process will not affect the magnetic efficiency of the transducer head. Alternatively, the two pole pieces 2-41 with their bobbin structures 2-42 may be united in their properly aligned critical gap spacing positions to the common mounting member 2-51 by a thin layer of suitable cement having a high curing temperature.

Instead of making the mounting member 2-51 of metal, it may also be made of a molded synthetic resin material formed of a compound which is stable against humidity and temperature variations, a fabric or fibre-impregnated synthetic resin materials being particularly suitable for such mounting members. To protect a double-pole-piece unit so formed by uniting the two flat aligned pole pieces to the flat aligning surfaces of a common mounting member 2-51, another generally similar mounting member 2-52 may be placed over the other side of the pole pieces and united to them and to the mounting member 2-51 by cement or solder or spot welding in a manner analogous to that described above. Alternatively, the two pole pieces may be held united in their aligned critical gap positions against the flat aligning surface of the mounting member 2-51 by placing them between the two mounting members 2-51, 2-52 and holding them clamped therebetween as by one or more screws, such as screws 2-53 extending through holes of the mounting member 2-52 and threadedly engaging threaded holes of the mounting member 2-51.

Instead of using two clamping screws 2-53, a single clamping screw extending through a central hole of the two mounting members is sufficient to hold the two aligned pole pieces with their winding bobbins aligned in their operative position between the two mounting members so as to constitute therewith a compact self-supporting double-pole-piece unit in which the thin flat pole pieces are maintained in their suitably aligned critical gap spacing position.

A magnetic record track sheet 31 and a magnetic record transducing head 40 of the general type described above are so supported and guided relatively to each other for recording or reproducing signals along narrow record traces of the record track surface magnetic signals that a portion of the record track engaging the convex longitudinally aligned pole faces bordering the gap is always maintained flexed into engagement with the convex pole faces during the relative motion between the record track and the transducer head. In the form of recording arrangement shown, such guide and contact relationship between the aligned convex pole faces of the transducer head and the record track is maintained by providing the region of the supporting member 33 which supports the record track sheet in its operative relationship relatively to the pole faces during their relative motion with a surface layer 32 of yieldable cushion-like material which permits limited flexing of the portion of the record track sheet member 31 which is engaged by the aligned convex pole faces during their relative motion for making magnetic records or reproducing records from magnetic record traces of the exposed record track surface 35, the transducer head 40 and the record track support 33 being subjected to suitable biasing forces for assuring that the pole faces subject the record track surface portion engaged thereby to limited flexing in the direction toward the cushioning layer 32 in the manner explained above.

A magnetic record track sheet member 31 and a magnetic record transducer head 40 of the general type described above may be utilized for recording magnetic signals along adjacent magnetic record traces of the exposed magnetic record track surface 35 by imparting a longitudinal motion to the record track sheet member 31 in the direction of the longitudinally aligned convex pole faces while the magnetic record transducer head is held biased with its pole pieces against the trace element of the record track surface engaged and flexed thereby and providing the driving mechanism which impels the record sheet 31 with means for imparting to the record transducer head 40 a slow motion in a direction transverse to the longitudinal direction of the sheet member 31 so that the pole faces shall trace on a continuous loop or belt-like sheet member 36 closely spaced adjacent spiral or helical magnetic record traces in any manner well known in the art.

It has been found in practice that a layer of felt or similar friction material of the type used as a facing for the top of all common phonograph turntables provides a good and effective cushion-like backing for a flexible thin record sheet member which assures that a positive contact engagement is maintained between the exposed magnetic record surface of the record member and the convex pole faces of the head. Furthermore, thin flexible magnetic record sheet members of paper film or thin metal will be also sufficiently flexed by the convex pole faces resting thereon to establish good stable contact engagement therewith if the guide or drive surface on which the record sheet member rests is made of metal, since it has been found that a thin stratum of air is usually entrapped between the back surface of the thin record sheet member and the surface of the guide member on which it rests and that such thin entrapped stratum of the air provides the required cushioning action. Furthermore, if the record sheet member is made with a backing of material such as paper or plastic film, the thickness of the backing member is as a rule sufficient to permit slight inward flexing of its exposed magnetic record surface when the pole faces of a magnetic record transducer head, such as described above, are biased in contact engagement therewith with a pressure of only about 10 grams.

As shown in Fig. 1, the guide roller 33 may be revolvably mounted on a shaft 52 extending from a frame wall 51 of the device. The magnetic record transducing head 40 is shown carried by an arm 55 provided with a guide collar 56 slidably movable on a guide rod 57 which is suitably supported on the frame structure of the device. The device is also provided with means for automatically imparting to the supporting arm 55 of the transducer head a motion in a direction transverse to the direction of the motion of the sheet member so as to automatically make a record along successive convolutions of a helical trace along the exposed magnetic record track surface of a record sheet 31, the ends of which are formed to form an endless loop. As shown in Fig. 1, the supporting arm 55 carries a spring arm 65 and a halfnut 66 which engages the thread of a feed screw 67 which extends in a direction parallel to the shaft 52 of the driving roller 37 for advancing the supporting arm 55 and the transducer head 40 in a direction transverse to the motion of the record sheet member at a slow rate synchronized to the speed with which the sheet 31 is impelled by the roller 37. The ends of the feed screw 67 are suitably journaled in the frame structure of the device. A driven portion of the feed screw 67 is suitably interconnected through a motion transmission mechanism to a drive element of the guide roller 33 so that the rotation of the feed screw 67 shall be suitably synchronized with the rotation of the driving roller 37.

The mounting portion 71-1 to which the magnetic head 40 is secured is carried by a lever arm 83 which is pivotally connected to an extension of the arm 55 so as to make it possible for the pole faces of the magnetic head to rest on the magnetic record surface with a limited low biasing force of only about 10 grams while the guide element, such as the halfnut 55 of the guide arm 55, maintains contacting engagement with the guide member, such as the feed screw 67, with the required much larger pressure force.

In the magnetic recording arrangement described above, the record transducer structure and the guide and impelling means which guide and impel the record sheet member are so arranged that a narrow trace-like portion of the magnetic record sheet member is flexed into sliding engagement with the exposed convex surfaces of the pole faces for causing the gap region of the narrow aligned pole faces to trace on the magnetic record surface adjacent closely spaced magnetic record traces for magnetically recording signals or playing back magnetic signals by fluxed interlinkage between the windings of the transducer head and successive longitudinal elements of the individual record traces. When magnetic records are made along adjacent magnetic record traces of a magnetic record sheet member, in the manner described above, for instance, by causing the magnetic head to be automatically moved to record on or play back from adjacent record traces by a mechanism such as a rotating screw and halfnut, it is important to make it possible to bring the thin aligned pole pieces of the playback transducer head into alignment with the narrow record traces of the exposed record track sheet along which the signals have been previously recorded.

In accordance with the invention, this is accomplished by providing the recording mechanism with means for making it possible to adjustably displace in lateral direction either the record sheet member or the record transducer head by a distance of the order of the thickness of the pole pieces or the spacing between adjacent record traces. With such arrangement, on playing back the magnetically recorded signals it is merely necessary to slightly adjust the lateral position either of the playback head or of the record sheet member as by turning a knurled head of a transducer head position-adjusting member until the playback level is increased to a maximum value. Such playback adjusting arrangement may be provided either by suitable screw control adjusting means interposed between a mounting portion of the magnetic head and the arm on which it is carried or by providing for adjustment of the feed screw in direction of its axis or by an adjustment of the element engaging feed screw or the grooved guide member, such as the stylus or halfnut engaging the feed screw or grooved guide nut. Such playback tuning adjustment is shown and described in my application Serial No. 612,728 filed August 27, 1945, now Patent No. 2,535,480 which issued on December 26, 1950, and in the application Serial No. 651,637 filed March 2, 1946 by A. L. W. Williams, now abandoned.

When signals are magnetically recorded on narrow adjacent longitudinal traces of a continuous magnetic track surface, difficulties are encountered in reproducing or playing back the signals recorded on the individual magnetic traces because the magnetic flux formed by the magnetic signals of the adjacent traces produce leakage fields which spread beyond each trace and may be picked up when playing back from an adjacent channel. This action is illustrated by the curves of Figs. 4 and 4–A in which the playback amplitude of a magnetically recorded signal is plotted as a function of the position of the pole faces of a pole piece structure of a magnetic transducer head in relation to the magnetic record trace recorded by a transducer head along a narrow trace of a record sheet member 31.

The curves of Fig. 4 were obtained with magnetic records made with a transducer head of the type shown in Figs. 2 and 3 on a uniform homogeneous magnetic recording medium of steel exhibiting a coercive force of 25 oersteds and moving at a speed of five feet per second. The flat pole pieces of the head were .014'' thick spaced 0.001 of an inch apart and held centrally aligned in the position indicated in a plane perpendicular to the plane of Fig. 3, and the magnetic record member 31 moving along the pole faces in a direction likewise perpendicular to the plane of Fig. 3.

In Fig. 4, the curves marked 100, 500, 1000 and 5000 cycles show the playback level for records made with signal frequencies of 100, 500, 1000 and 5000 cycles on such trace, with equalization so that the played back signals shall be of the same level for each of the frequencies, and the recording process carried on at the portion of zero displacement on the aligned pole pieces 2–41 on the moving record surface member 31, corresponding to the zero position of the abscissa axis of Fig. 4 which indicates the lateral displacement of the aligned pole pieces from its zero recording position, in thousandths of an inch. It will be seen that when playing back the 100 cycle record with the pole pieces displaced as much as .060 of an inch from the center of the record trace, the level of the pick-up signal changes only slightly. However, as the frequency of the recorded signals is increased, the level of the picked-up signal falls off for the laterally displaced positions of the pole pieces.

Thus, for 100 cycles, the playback level does not fall off very much even if the reproducing head is displaced many times the pole piece thickness from the original record track. On the other hand, for 5000 cycles the playback level drops sharply when the pole pieces are displaced from their centered position along the record trace on which the record was made. Thus, if the transducer head is laterally displaced by a distance equal to the thickness of the pole pieces, the 5000 cycle signal drops about 20 db. It will also be noticed that for such 5000 cycle frequency a lateral shifting of the transducer head pole pieces by (+) or (—) .003 inch will not materially affect the reproducing level.

This may be explained by reference to Fig. 5 in which the dotted sine wave curve 460 represents a sinusoidal wave recorded longitudinally on a record track moving in the direction of the arrow. In each element of the magnetic record trace, the longitudinal magnetic flux will vary sinusoidally and the distance between two subsequent opposite flux maxima, which equal one-half of the wave lengths, may be considered the length of identical but oppositely polarized elemental bar magnets constituting the magnetically recorded signals.

The length of the elemental magnets so formed by magnetically recorded signal waves determines the extent to which the leakage flux of these elemental bar magnets, representing the recorded signals, spread laterally therefrom. The bar magnets representing the records of the higher frequencies are shorter and their concentrated leakage flux spreads only little in a direction lateral from the bar magnets. On the other hand, the bar magnets of the low frequency signal records are of substantial length and their concentrated leakage flux extends considerably beyond any lateral direction from the center region of the bar magnet.

Fig. 4–A shows curves similar to those of Fig. 4 obtained with a magnetic record member of the type described in Kornei application Serial No. 685,092, filed July 20, 1946 (now abandoned), having a record surface of bonded powdered permanently magnetizable material, the magnetic powder exhibiting a coercive force of about 120 oersteds. The curves of Fig. 4–A, although generally similar to those of Fig. 4, show that, from the standpoint of crosstalk, the bonded powder record medium is definitely superior to a homogeneous magnetic record medium. Thus, by comparing the 100 cycle, 500 cycle and 1000 cycle curves of Figs. 4 and 4–A it is seen that in each case the bonded magnetic powder recording medium exhibits a lower playback response for corresponding lateral displacements of the playback head. With a 1000 cycle signal, for example, a displacement of about 32 mils is required to lower the response from the homogeneous magnetic stratum by 20 db, whereas only 27 mils displacement produces the same result with the bonded powder magnetic stratum.

According to the invention, the difficulties in playing back recordings made on the adjacent tracks of a magnetic surface record are eliminated by using a signal modulated carrier frequency of a frequency range reproducibly recordable on the magnetic recording medium at the given speed and magnetic gap width, the range of the frequency being sufficiently high so as to reduce the playback level by at least about 20 db if the pole piece is laterally displaced by a distance equal to the width of the record trace or the thickness of the pole pieces. Such recording arrangement eliminates the difficulties arising from the fact that magnetic recordings of low frequency signals spread laterally to such an extent that about a one-fourth inch spacing between record track traces is required to properly space recorded signals which form magnet waves having a length of 600 mils.

By following the principles of the invention and utilizing the signal modulated carrier for recording relatively low frequency signals, such as signals of the speech frequency range used for good telephone transmission or dictating purposes, the recording may be made on adjacent traces of a magnetic record sheet or tape with a minimum spacing between the individual recording tracks while reducing crosstalk to a negligible level.

In designing such signal modulated carrier frequency magnetic recording systems, it is important that the speed of the record trace relatively to the transducer head and the magnetic slit thereof be so chosen and correlated as to assure that for the highest side band frequencies of the carrier used in recording, the magnetic record of such frequencies shall have wave lengths greater than the magnetic recording slit, or, in general, the effective magnetic gap between the pole pieces of the transducer head.

The extent to which the wave length of the recorded carrier may approach the recording slit or pole piece gap with good recording and reproducing depends on the coercive force and other characteristics of the recording medium. If a recording medium of high coercive force is used, higher carrier frequencies may be used in the recording. In general, the carrier frequency should be about three times higher than the highest modulation frequency. Thus, for instance, for making records of telephone conversations or of dictation requiring good reproduction over the speech frequency range up to about 2500 cycles, the carrier frequency may be of the order of about 10,000 cycles.

The foregoing shows that the wave length of the magnetic record impressions made on the magnetic record trace is a determining factor governing the flux spreading and crosstalk. By choosing the appropriate carrier frequency, as explained above, the spreading of the flux of the recording wave tracks may be confined substantially within the narrow width of the track. Thus, by way of example, in utilizing a magnetic head having pole pieces .014 inch thick for recording signals with modulated carrier frequency system of the invention on adjacent magnetic record traces spaced by .006 inch the lateral displacement of the pole faces of the transducer head so as to overlap two adjacent tracks will give a substantially negligible playback level.

According to one phase of the invention, this factor is utilized for making it possible to record on a continuous magnetic sheet material surface, for instance, a thin flexible sheet coated or plated or embodying a layer of permanently magnetizable material without grooving the record sheet. In such recording reproducing arrangement of the invention, the reproducing head, which may also serve as a recording head, is provided with means for making it possible to laterally adjust its position by a distance of the order of the thickness of the pole piece or the spacing between adjacent record tracks.

With such arrangement, on playing back a signal modulated carrier frequency recording of the invention, it is merely necessary to slightly adjust the lateral position of the transducer head structure, as by turning the knurled-head transducer position-adjusting screw, until the playback level is increased to its proper value. This adjustment is very easily accomplished because, as indicated by Fig. 4, even for a carrier frequency of only 5000 cycles, the playback level would be negligible with the transducer head having pole pieces .014 inch thick displaced so as to equally overlap two adjacent tracks which are spaced by .006 inch.

Fig. 4–A shows that a modulated 10,000 cycle carrier can be suitably recorded on adjacent record traces which have substantially no spacing between them. A lateral displacement of 14 mils is there shown as reducing the playback response of such recordings by at least about 30 db. Record traces or channels 14 mils wide crowded together so that they are contiguous and leave no unused record member surface between them are also spaced 14 mils apart.

Although a 10,000 cycle carrier is extremely effective for limiting cross talk, carriers of lower frequency are also effective and have the advantage of making it possible to make the desired recording at a lower speed, and with a lesser amount of the record track surface. As shown by the curves of Fig. 4 any carrier frequency which when modulated exhibits a low frequency limit higher than 1000 cycles will be recorded in the form of bar magnet which are short enough to have only very little lateral spreading of flux. Thus a 1000 cycle signal wave, when recorded at five feet per second, produces a succession of bar magnets 0.030 inch long and a recorded 5,000 cycle wave forms bar magnets 0.006 inch long.

The curves of Fig. 4 give results obtained with magnetic recordings made at a record track speed of five feet per second. At lower speeds the wave lengths of recordings are proportionately lowered so that at a speed of one foot per second the same playback level playback displacement ratios are obtained with signal frequencies one-fifth of those indicated in Fig. 4. For example, at a recording speed of one foot per second the lower limit of the modulated frequency band should be at least about 200 cycles per second.

Higher record track speeds have the advantage of providing higher playback levels. The signal induced in the windings of the magnetic pick-up head has an amplitude proportional to the rate of change of magnetic flux, which in turn depends on the rate of record track movement.

Either amplitude modulation or frequency modulation or phase modulation, may be used for providing the signal-modulated carrier-frequency oscillations of a frequency range which is reproducibly recordable on a magnetic recording medium, and the carrier frequency oscillator circuits with the associated modulator and amplifier circuits are suitably combined in the recording circuit system used.

Magnetic recording systems for recording signals as a frequency modulated carrier wave are described and claimed in the Arndt et al. application Serial No. 576,386, filed February 6, 1945, issued as Patent No. 2,521,623, on September 5, 1950, and modifications of such system are described in the copending Shaper et al. application Serial No. 655,446, filed March 19, 1945, issued as Patent No. 2,513,683, on July 4, 1950.

In magnetic recording systems which record signals as a frequency modulated carrier wave, as disclosed in the foregoing Arndt et al. application, the carrier signal flux impressed on the recording medium operates automatically as an erasing flux and such systems do not require any erasing head. Such phase modulation magnetic recording systems are also effective in compensating for the non-linear magnetizing characteristics of the magnetic recording media, and they do not require the usual high frequency biasing flux or D. C. biasing flux of the type generally used in magnetic recording systems.

If desired the apparatus of the invention may be used with the modulated carrier recording technique described and claimed in the copending Begun application Serial No. 612,728, filed August 27, 1945, in which the amplitudes of the modulated carrier are limited so as to confine the recorded signals to the substantially straight portions of the record track magnetization curve.

Fig. 6 indicates diagrammatically the general arrangement of one form of a magnetic recording and reproducing system based on the principles of the invention.

The magnetic record transducing operations are under the control of a multi-blade switch 556 which connects the windings of the record transducing head 40 with either the output of a recording network 552 or the input of a playback network 557. A signal source, such as the microphone 551, impresses the input signal on the recording network 552, which embodies a source of carrier oscillations, a modulator and amplifier for producing with the input signals a modulated carrier current which is fed to the windings of the recording head 40. With the switch 556 in the record position shown, its blade 556–2 connects the output side of the recording network 552 to the windings of the transducer head 40. At the same time, the other blade 556–1 of the switch is shown utilized to supply the windings of the head 40 with the conventional A. C. bias furnished by a bias oscillator 560. In the opposite playback position of the switch 556, blade 556–1 disconnects the windings of the transducing head 40. At the same time the other switch blade 556–2 opens the circuit from the output side of the recording network 552 and connects the windings of the transducer head 40 to the input side of the playback network 557 which includes a demodulating arrangement as well as amplifying means for reproducing the signal input as by means of the loudspeaker 558.

When magnetically recording signals with a frequency modulated carrier wave, any portion of a record trace may be erased by supplying the magnetic head with unmodulated carrier wave because the individual half cycles of the unmodulated carrier wave are effective in neutralizing the recording medium in much the same way as neutralization of the recording medium is effected by supplying the magnetic head with high frequency oscillations. The neutralization or erasure of prior records on the recording medium by the unmodulated carrier wave is effected by reason of the fact that each half cycle of the unmodulated carrier wave impresses on the magnetic recording medium a saturating magnetic flux of opposite polarity, the neutralization or erasure process being thus identical with the well known neutralization or erasure process produced by supplying the magnetic head with high frequency oscillations. However, as explained in the Arndt et al. application referred to above, when using a frequency modulated carrier wave for recording signals, the desired record is produced by varying or modulating the frequency of the carrier wave in accordance with the signal so that the recorded signals are represented on the recording medium by magnet bars of different length corresponding to the variations in the frequency of the carrier wave effected by the modulation process.

However, when recording with an amplitude modulated carrier wave it is desirable to provide for supplying the magnetic erasing head with the unmodulated carrier current oscillations of a magnitude sufficient to effect neutralization or erasure of undesired portions of a recorded magnetic record trace.

Fig. 6 also shows an arrangement for effecting erasures of undesired portions of recorded signals from record traces of the record member on which a record was made by a conventional recording process operating with high frequency bias. As shown, a switch assembly 570 under the control of a switch button 572 is arranged for supplying amplified high frequency currents from the oscillator 560 to the windings of the head 40. These currents are of a frequency high enough to demagnetize the successive elemental portions of the record track as they pass along and bridge the gap 443 of the transducing head 40. In the form shown, the switch assembly 570 has a switch arm 570–1 which feeds the output of oscillator 560 to an amplifier of recording network 552, and a second switch arm 570–2 which feeds the amplified oscillator currents to the windings of the head 40 for erasing the record.

The oscillator source 560 may be in the form of a conventional vacuum tube oscillator using a single vacuum tube to supply the necessary A. C. bias currents. One stage of amplification is all that is required to change this bias to currents having an amplitude large enough to act as erasing currents. With the arrangement of the type described using only a single magnetic record transducing head for recording, playing back, and erasing, erasing currents may be produced at any time upon interruption of the playback process or recording process. This makes it possible to erase an undesired portion of a record trace without requiring a relatively large output erasing current amplifier. Furthermore, the amplifying means in the recording and the playback network may also be used in common with a suitable switch arrangement to properly connect the amplifier of either network as required. Further economies may be effected as by arranging the carrier source of the recording network 552 which may be in the form of a vacuum tube oscillator so that by switching to playback the same vacuum tube may be used as an additional playback amplifier.

The switch assembly 570 may be conveniently mounted, as for example, on one of the external surfaces of the apparatus and may be of the type in which the control button 572 is outwardly biased and must be held down manually during that period in which erasing is to be effected. As so arranged, any undesired portion of a magnetic record trace may be erased and the undesired signal removed. For example the switch 556 may be set for playback and the transducer head positioned to engage the proper portion of the record track so that when the objectionable portion of the recording is reached, as determined by listening to the loudspeaker 558, the control button 572 is pushed and held down until the speaker 558 indicates that all of the objectionable recording has been removed.

Fig. 7 shows the general relationship of one practical form of a magnetic record transducing apparatus and its circuit elements utilizing a single magnetic head for recording, playback and erasing undesired portions of recorded matter along selected parts of record traces by means of the same oscillator which supplies the high frequency bias during the recording process, and utilizing one of the amplifying stages of the playback or recording amplifier circuit for amplifying the oscillations of the bias supply source in order to enable the amplified high frequency currents of the bias source to effect the desired erasure of signals magnetically recorded along the record trace.

The magnetic record reproducing device shown diagrammatically in Fig. 7 comprises a magnetic head 40, such as described above, arranged to record signals along a magnetic record trace of a moving magnetic record sheet member 31; a single sound transducer device 7–12 serving both as a microphone during the recording process and as a sound reproducer or loudspeaker device during the playback process; a control switch 7–15 for selectively establishing playback and recording circuit conditions; and a circuit network generally designated 7–20, including the elements of the amplifier bias supply source and the electric power supply for the amplifier and bias supply source.

The sound transducer 7–12 is of a conventionally known type which performs the function of a microphone in converting sound signals reaching it into corresponding electric signals, and as a sound reproducer in converting electric signals supplied thereto into sound. Either a piezoelectric crystal sound transducer or a voice coil type electro-magnetic sound transducer may be used.

The circuit network 7–20 has three amplifier stages associated with the vacuum tube amplifier elements 7–21, 7–22, 7–23 and a bias oscillator stage associated with amplifier vacuum tube element 7–24.

The amplifier stages of the tubes 7–21, 7–22 and 7–23 are arranged to operate in cascade as a three stage amplifier during the playback process, the several amplifier stages being arranged to be resistance coupled to each other. During the recording process only two of the amplifier stages associated with the tube elements 7–22, 7–23 are utilized to amplify the signals supplied by the sound transducer 7–12 operating as a microphone and delivering the required recording currents to the windings of the magnetic head 40. During the recording process the magnetic head is also supplied with the required high frequency oscillatory bias currents produced by the oscillator stage associated with the tube element 7–24, the electrodes of which interconnect with the circuit elements shown and selected so as to generate high frequency oscillations of the order of about 30 k. c., for instance. The electric operating energy is supplied to the amplifier stages and the oscillator stage by a power supply source shown as a two-phase rectifier tube 7–31 which is supplied through a conventionally connected transformer to a domestic current supply source, for instance, of 110 v. A. C., the rectifier alternating current being provided with a filter network 7–32 delivering highly filtered D. C. at terminal 7–33, and less filtered D. C. at terminal 7–34. To the highly filtered D. C. B-supply filter terminal 7–33 are connected the plate circuits of the initial amplifier stages of tube elements 7–21, 7–22. To the less filtered D. C. B-supply filter terminal 7–34 are connected the plate circuits of the output amplifier stage of tube element 7–23 and of the oscillator stage tube element 7–24. The filter circuit includes also additional resistance element 7–35 to provide the required operating bias for the input grid of the amplifier tube elements 7–22, 7–23, 7–24.

The record-playback switch 7–15 is shown as being of the conventional type and its contact blades may be actuated either to the playback position, in which it is shown, or to the opposite recording position. There is also shown an additional multi-blade contact switch 7–40 which may be of the type which keeps its contact blades normally biased to the position shown, the blades being brought to the opposite operative position only when suitably actuated as by pressing a pushbutton indicated at 7–41.

Further features of the magnetic recording device shown diagrammatically in Fig. 7 will appear from the following description of its operation.

It is assumed that the erase switch 7–40 remains in the non-operative position shown, in which position its contacts bridge over complete bridging or jumper connections between the circuit portions indicated by the U-shaped dash line jumper connections designated 7–42.

With the record-playback switch 7–15 in the playback position shown its fourth movable contactor elements establish the following circuit connections which provide for the playback of magnetically recorded signals. The ungrounded lead from the windings of the magnetic head 40 is connected through the first contact member of the switch to the input lead 7–35 of tube element 7–21 of the first amplifier stage. The signal input supplied by the magnetic head is amplified by the three cascade connected amplifier stages of tube units 7–21, 7–22, and 7–23, the amplified output being supplied by way of output lead 7–36 of tube unit 7–23, and the second contactor of the selector switch 7–15 to the sound transducer device 7–12, which delivers sound output corresponding to the electric signals impressed thereon, the circuit connection being completed by the ground connections shown. The playback operation proceeds as long as the recording medium 31 moves relatively to the head 40 while the selector control switch 7–15 remains in playback position. Throughout such playback operation the oscillator associated with the tube unit 7–24 remains de-energized.

When the selector switch 7–15 is operated to the opposite recording position its contact blades establish the following circuit connections. In the recording position the sound transducer device 7–12, which now operates as a microphone, is connected through the second contact blade of the selector switch 7–15 to the input lead 7–37 connected to the input grid of the second amplifier stage of tube unit 7–22—which operates during the recording operation as the first amplifier stage, and the output of which, after amplification by the output amplifier tube unit 7–23, is impressed through the output lead 7–36 by way of the third contact of the selector switch 7–15 in its righthand position to one terminal of the winding of the transducer head 40, the circuit being completed through the ground connections shown so as to impress upon the windings of the record transducing head 40 currents which produce in the effective gap region of the head the desired magnetic recording flux.

In the righthand recording position of the selector switch 7–15 its fourth contact blade connects the B+ supply terminal 7–34 to the plate circuit of the oscillator tube 7–24 and causes it to produce and deliver the required high frequency bias oscillations. The oscillating circuits of the bias oscillator tube unit 7–24 have an output lead 7–37, including a condenser 7–38, through which the proper component of high frequency biasing current is supplied, by way of its connection to the third contact blade of the selector switch to the windings of the transducer head 40 so as to produce in the effective magnetic gap region of the head the proper component of high frequency alternating biasing flux. The coupling condenser 7–38 in the oscillator output lead and the other circuit elements of the system are so designed as to make a suitable component of the high frequency oscillations produced by the oscillator tube unit 7–24 with the amplified signal current supplied by the microphone transducer 7–12 in such manner as to induce in the effective gap region of the recording head 40 the desired combination of the signal recording flux and the superimposed high frequency biasing flux component. It will be noted that with the circuit arrangement shown the output lead 7–37 of the single oscillator stage remains connected to the windings of the recording playback head 40 not only during a recording operation but also during the playback operation. As shown, an additional condenser 7–39 is connected across the B+ supply lead connection to the plate circuit of the oscillator tube unit 7–24, this condenser 7–39 serving as a capacitive energy storing device which, in conjunction with the other elements of the oscillator circuit, operates to impress upon the windings of the magnetic transducer head 40 a decaying high frequency oscillating current of such character as to automatically effect a neutralization of the magnetic core of the transducer head whenever a recording operation is stopped, either by the de-energization of the recording circuits or by actuation of the selector switch 7–15 from the righthand recording position to the lefthand playback position.

With such arrangement the oscillator associated with the tube unit 7–24 continues to produce high frequency oscillating currents and continues to supply them to the windings of the magnetic head 40 after the plate circuit of the tube has been disconnected from the B+ supply lead, the oscillating current so supplied to the head decaying within a few oscillating cycles and thereby neutralizing the magnetic core of the head. With the arrangement shown the oscillator stage associated with the oscillator tube unit 7–24 is loaded during a recording operation both by the windings of the magnetic head 40, as well as by the circuit elements of the amplifier output stage of tube unit 7–23 to which it is connected by the third contact blade of the selector switch 7–15, and the oscillator circuit is so adjusted as to provide an oscillating output of the proper biasing level when the oscillator stage is subjected to such compound loading.

The circuit elements of the system may be readily so designed that when the selector switch 7–15 is moved from the recording position to the play position, the oscillator output lead 7–37 is disconnected from the amplifier output lead 7–36, thereby decreasing the oscillator load and causing the oscillator output to increase or surge up from the bias level to a level high enough for supplying to the windings of the magnetic head 40 oscillating current sufficient to saturate the magnetic core of the head and bring about its magnetic neutralization by a succession of decaying oscillating cycles.

To secure effective erasing action under such operating conditions, the elements of the selector switch 7–15 may be so adjusted that when actuated from the record to the playback position its third contact blade operates first to open the connection of the oscillator output lead from the amplifier output lead before the fourth contact blade opens the plate circuit of the oscillator tube to the B+ supply circuit. In most instances, any residual permanent magnetism of the magnetic core of a magnetic head is sufficiently low as to make it possible to effect its neutralization after the end of a recording operation by a decaying oscillating current, the first magnetizing cycle of which is below the level required for saturating the magnetic core of the head. In other words, the initial or highest level of the de-magnetizing current that has to be supplied by the bias oscillator stage to the magnetic head at the end of a recording cycle need not be high enough to completely saturate the magnetic core, and the surge level of the highly saturated load output need not be very much higher than the bias level in order to secure effective demagnetization of the head at the end of a recording operation.

Without limiting the scope of the invention, but in order to enable ready practice of the invention, there are given below data of one form of magnetic recording device of the type shown in Fig. 7 which is now on the market and serves as a low cost speech dictating device.

The magnetic head 40 is of the type shown in the Begun application Serial No. 688,738, filed August 6, 1946, issued as Patent No. 2,513,617 on July 4, 1950, or Kornei application Serial No. 688,034, filed August 2, 1946, issued as Patent No. 2,523,576 on September 26, 1950. The two tube units 7–21, 7–22 form parts of a single tube type 6SL7–GT. The tube units 7–23, 7–24 form part of a single tube 6SN7–GT. Rectifier tube 7–31 is a type 6X5–GT/G tube. The plate circuit of the oscillator tube unit 7–24 includes a reactance of 30 millihenries. The magnetic record transducing device shown is being sold on the market under the trade name "Mail-A-Voice."

In accordance with the invention, a generally simple magnetic record transducing device of the type described above is combined with a simple erasure control arrangement which makes it possible to utilize the single head 40, which is used for carrying on, playing back and recording operations with a high frequency oscillating current of a greater level than normally supplied by the oscillator in order to make it possible to erase a selected portion of a record made by the recording head while the sequence control switch 7–15 is either in the recording operation or in the playback operation. In the arrangement of Fig. 7 the additional erase control switch 7–40 is provided to selectively interrupt either a playback or a recording operation and establish circuit connections by means of which the oscillator stage is maintained in an oscillating condition, and its oscillating output is impressed on one or more amplifying stages of the amplifier in such manner as to supply amplified high frequency oscillation to the windings of the recording head sufficient for producing in the effective gap region of the magnetic core of the head a high frequency erasing flux required for erasing records made by or during a previous recording operation. As stated before, the erasing switch 7–40 may be of the type shown and its blades may be permanently biased to establish the bridging connection shown which make it possible to carry on either playback operation or recording operation under the control of the selector switch 7–15. The erasing switch 7–40 is, however, effective to at any time interrupt a recording operation and to establish the following erasing circuit connections to the head when its contact blades are actuated to a righthand operative position as seen in Fig. 7. In the righthand operating position the erasing switch 7–40 will establish the following operating condition. Its fifth righthand contact blade in the righthand position connects the plate circuit of the oscillator tube unit 7–24 to the B+ terminal 7–34, thereby energizing the oscillator stage and causing it to generate the high frequency oscillations. The third and fourth righthand contact blades of switch 7-40 in the righthand position connects the output lead 7-37 of the single oscillator stage tube unit 7-24 to the input lead 7-43 of the last amplifier stage of tube unit 7-23 and disconnects them from their normal circuit connections in order to impress on the output lead 7-36 of the amplifier output stage amplified high frequency oscillating current of the magnitude required for producing with the magnetic head 40 the desired erasing flux.

The output lead 7-36 of the output amplifier tube 7-23 is connected by the first and second contact blades of the erasing switch 7-40 in their righthand position to the windings of the record transducing head 40 for supplying it with the amplified high frequency oscillations of a level sufficient to produce in its effective gap region the required erasing flux. The erasing switch 7-40 may be conveniently mounted on one of the readily accessible walls of the recording device so that any time during a recording operation or playback operation a desired portion of a recorded record trace may be erased by momentarily actuating the erasing switch 7-40 from the release position to an operative highthand position shown. Although the erasing switch 7-40 shown is indicated as one which is manually operated, it may obviously be remotely controlled as by combining it with a relay or solenoid which is arranged to operate its contacts from one position to another.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

The principles of the invention explained in connection with specific exemplifications thereof will suggest to those skilled in the art many other applications and modifications of the same. It is accordingly desired that the appended claims be construed broadly, and that they shall not be limited to the specific details shown and described in connection with exemplifications thereof.

I claim:

In a magnetic record transducing apparatus: ring-type magnetic recording head means having a pole piece of a given width; a flexible magnetizable record member having an extended permanently magnetizable record surface with a coercive force of 120 oersteds or higher comprised of a dispersion in a binder of finely powdered permanently magnetizable particles in magnetic flux linkage relationship with said recording head means for recording along adjacent closely spaced record traces; electrical circuit means connected to said recording head means and including a source of carrier current oscillations of a given frequency and modulator means for modulating said carrier current oscillations; impelling means for driving said record member past said recording head means at a given rate of speed correlated to the frequency of said carrier current oscillations so that the longest signal wave length recorded on said record member is about 30 mils and the spread of said recorded signal in said record member toward an adjacent record trace is substantially confined to only about three-halves the given width of said pole piece or less.

SEMI JOSEPH BEGUN.

References Cited in the file of this patent

UNITED STATES PATENTS

| Number | Name | Date |
|---|---|---|
| 1,886,616 | Alverson | Nov. 8, 1932 |
| 2,229,293 | Huntley | Jan. 21, 1941 |
| 2,235,132 | Woolridge | Mar. 18, 1941 |
| 2,351,004 | Camras | June 13, 1944 |
| 2,378,383 | Arndt | June 19, 1945 |
| 2,378,388 | Begun | June 19, 1945 |
| 2,411,849 | Camras | Dec. 3, 1946 |
| 2,419,195 | Begun | Apr. 22, 1947 |
| 2,497,654 | Begun | Feb. 14, 1950 |

FOREIGN PATENTS

| Number | Country | Date |
|---|---|---|
| 119,071 | Japan | Feb. 17, 1937 |
| 621,263 | Germany | Nov. 4, 1935 |
| 880,559 | France | Mar. 30, 1943 |